(12) United States Patent
Paek

(10) Patent No.: US 11,764,370 B2
(45) Date of Patent: Sep. 19, 2023

(54) SYSTEM AND METHOD FOR CONTROLLING OPERATION OF FUEL CELL SYSTEM

(71) Applicants: Hyundai Motor Company, Seoul (KR); Kia Corporation, Seoul (KR)

(72) Inventor: Jun Yeol Paek, Seoul (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 0 days.

(21) Appl. No.: 17/736,779

(22) Filed: May 4, 2022

(65) Prior Publication Data
US 2023/0105961 A1 Apr. 6, 2023

(30) Foreign Application Priority Data

Oct. 5, 2021 (KR) .......................... 10-2021-0131904

(51) Int. Cl.
| | |
|---|---|
| H01M 8/04 | (2016.01) |
| H01M 8/04014 | (2016.01) |
| H01M 8/04664 | (2016.01) |
| H01M 8/04537 | (2016.01) |
| H01M 8/0432 | (2016.01) |

(52) U.S. Cl.
CPC ..... *H01M 8/04014* (2013.01); *H01M 8/0432* (2013.01); *H01M 8/04552* (2013.01); *H01M 8/04671* (2013.01)

(58) Field of Classification Search
CPC ........... H01M 8/04014; H01M 8/0432; H01M 8/04552
See application file for complete search history.

(56) References Cited

U.S. PATENT DOCUMENTS

2019/0131638 A1* 5/2019 Won .................. H01M 8/04828

FOREIGN PATENT DOCUMENTS

KR    10-1592720    2/2016

* cited by examiner

*Primary Examiner* — Olatunji A Godo
(74) *Attorney, Agent, or Firm* — MORGAN, LEWIS & BOCKIUS LLP

(57) ABSTRACT

A system and method for controlling operation of a fuel cell system, includes determining whether there is a risk of flooding by confirming whether the fuel cell system satisfies a predetermined flooding risk condition, and performing air supercharging by supplying air at a flow rate increased compared to an air supply demand to fuel cells of the fuel cell system, when the controller confirms that the fuel cell system satisfies the flooding risk condition.

15 Claims, 7 Drawing Sheets

(NORMAL OPERATING CONDITION)

(EXPOSURE TO FLOODING CONDITION FOR DESIGNATED TIME)

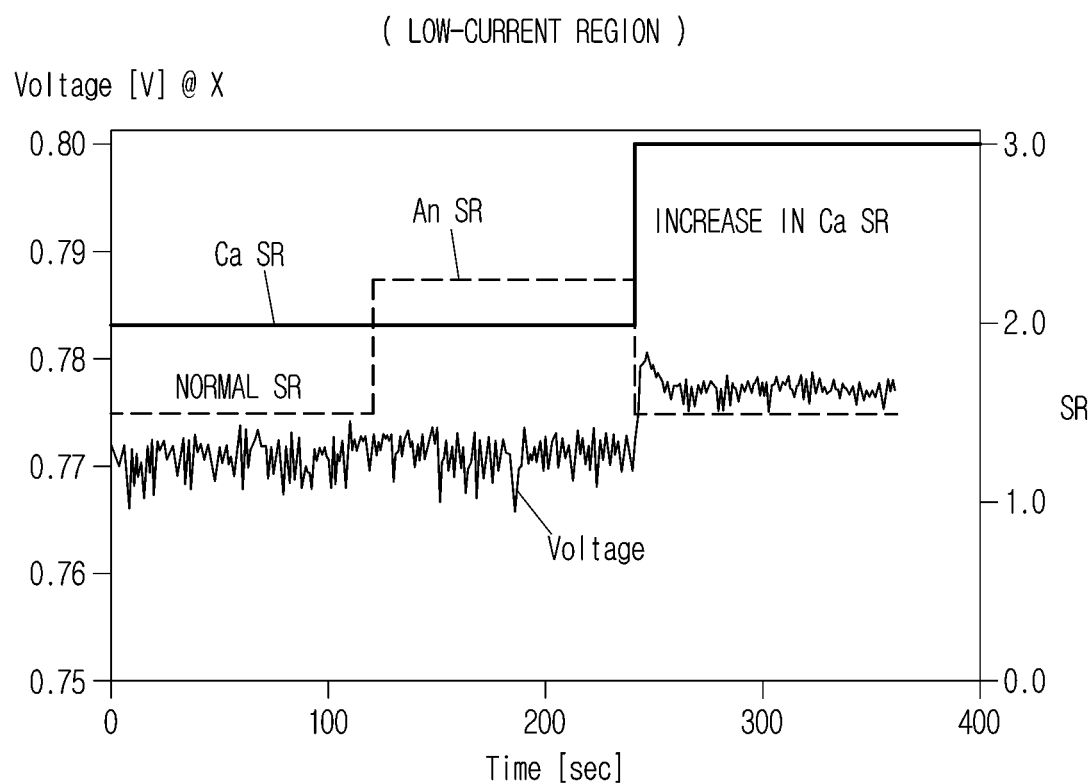

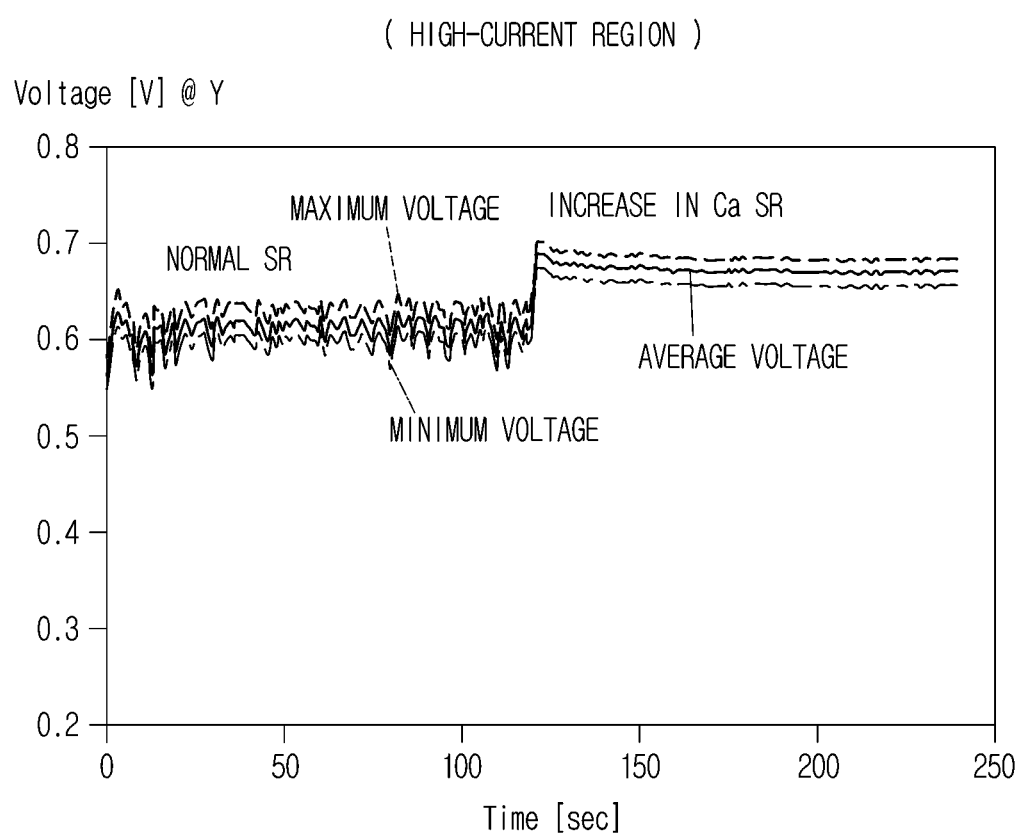

SYSTEM AND METHOD FOR CONTROLLING OPERATION OF FUEL CELL SYSTEM

CROSS-REFERENCE TO RELATED APPLICATION

The present application claims priority to Korean Patent Application No. 10-2021-0131904, filed on Oct. 5, 2021, the entire contents of which is incorporated herein for all purposes by this reference.

BACKGROUND OF THE PRESENT DISCLOSURE

Field of the Present Disclosure

The present disclosure relates to a system and method for controlling operation of a fuel cell system, and more particularly, to a system and method for controlling operation of a fuel cell system which may optimize the operating state of a fuel cell stack of the fuel cell system.

Description of Related Art

In a fuel cell system in which an electrochemical reaction occurs in a fuel cell stack using hydrogen and air supplied from the outside, water, i.e., a byproduct of the electrochemical reaction, is converted into the form of water vapor, saturated liquid or ice depending on real-time driving conditions including temperature, pressure, etc., and accordingly, transfer characteristics of water are changed. Furthermore, water also influences transfer characteristics of gas and electrons passing through channels of separators, gas diffusion layers, catalyst layers and an electrolyte membrane.

That is, flooding in which there is too much water or dry-out in which there is not enough water occurs in the fuel cell stack, to prevent dry-out of the fuel cell stack, exposure of the fuel cell stack to a high temperature must be prevented, and for the present purpose, cooling performance must be secured.

However, when the maximum amount of heat which may be radiated by the fuel cell system is reduced due to an environmental factor, such as a high ambient air temperature or uphill driving, or a factor, such as failure of a cooling part, i.e., a coolant pump, a cooling fan, a thermostat, or the like, the output of the fuel cell stack must be reduced to maintain the maximum allowable temperature.

In this regard, a method for controlling operation of a fuel cell system including a recovery operating mode is generally known. The method includes determining a dry-out state of the inside of a fuel cell stack based on the cooling performance reduced state of the fuel cell system or the deteriorated state of the fuel cell stack, and classifying the diagnosis level of the fuel cell system depending on the determined state, and at least one recovery operating mode corresponding to the classified diagnosis level is executed.

However, it is difficult to effectively apply accurate diagnosis of the state of the fuel cell stack and classification of the diagnosis level thereby to an actual vehicle. Therefore, a method for controlling operation of a fuel cell system which is advantageously applied to an actual vehicle by simplifying a driving condition is required.

The information disclosed in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

When a fuel cell vehicle and system are operated, durability of a fuel cell stack corresponding to a core portion is very important. Fuel cells may be exposed to various conditions, and when the fuel cells are operated at a constant current for a long time, such as constant-speed driving of the fuel cell vehicle for a long time, increase in idle time, or operation of a fuel cell power generation system, flooding occurs, and accordingly, accumulation of water in the fuel cell stack, reduction of cell voltage stability or sudden voltage drop occurs and thus causes a difficulty in operation.

Various aspects of the present disclosure are directed to providing a system and method for controlling operation of a fuel cell system which may diagnose the state of a fuel cell stack and variably control the flow rate of air supplied depending on an ambient air temperature when a cell voltage stability problem occurs or there is a risk of occurrence of the cell voltage stability problem, to optimize the operating state of the fuel cell stack.

Various aspects of the present disclosure are directed to providing a system and method for controlling operation of a fuel cell system which may simplify a state diagnosis method of a fuel cell stack and continuously maintain the normal state of the fuel cell stack without flooding or dry-out, to effectively improve durability of the fuel cell stack corresponding to a core portion of the fuel cell system.

In accordance with an aspect of the present disclosure, the above and other objects may be accomplished by the provision of a method for controlling operation of a fuel cell system, the method including determining whether there is a risk of flooding by confirming whether the fuel cell system satisfies a predetermined flooding risk condition, and performing air supercharging by supplying air at a flow rate increased compared to an air supply demand to fuel cells of the fuel cell system, when the controller confirms that the fuel cell system satisfies the flooding risk condition.

The flooding risk condition may be configured so that a determination is made that there is the risk of flooding when a standard deviation of cell voltages of the fuel cells is equal to or greater than a first reference value.

In the determining whether or not there is the risk of flooding, whether or not there is the risk of flooding may be determined when the fuel cell system is operated at a constant current for a predetermined time period or more than the predetermined time period.

In the performing the air supercharging, the air supercharging may be terminated when the standard deviation of the cell voltages is reduced to a second reference value or less than the second reference value or when the cell voltages are reduced to a predetermined lower limit voltage or less than the predetermined lower limit voltage, and the method may further include restoring the flow rate of air supplied to an original flow rate after the air supercharging is terminated.

In the performing the air supercharging, the flow rate of air supplied may be controlled to reach a flow rate increased by a predetermined rate compared to a current air supply demand.

In the performing the air supercharging, the flow rate of air supplied may be controlled to be varied depending on an ambient air temperature.

In the performing the air supercharging, (i) when the ambient air temperature exceeds a first reference temperature and is lower than a second reference temperature, the flow rate of air supplied may be controlled to reach a first flow rate increased by a predetermined first rate compared to the current air supply demand, (ii) when the ambient air temperature is equal to or lower than the first reference temperature, the flow rate of air supplied may be controlled to reach a second flow rate increased by a predetermined second rate compared to the current air supply demand, (iii) when the ambient air temperature is equal to or greater than the second reference temperature, the flow rate of air supplied may be controlled to reach a third flow rate increased by a predetermined third rate compared to the current air supply demand, and the first rate may be greater than the third rate but may be less than the second rate.

In the performing the air supercharging, the flow rate of air supplied may be linearly increased for a predetermined control time to reach the flow rate increased by the predetermined rate compared to the current air supply demand.

In accordance with another aspect of the present disclosure, there is provided a system for controlling operation of a fuel cell system configured to supply air to fuel cells and including an air supply device configured to control a flow rate of air supplied, the system including a controller configured to monitor cell voltages of the fuel cells and to control the flow rate of air supplied according to a result of monitoring of the cell voltages, wherein the controller is configured to confirm whether or not the fuel cell system satisfies a predetermined flooding risk condition based on the cell voltages, increases the flow rate of air supplied compared to an air supply demand, and supplies the increased flow rate of air supplied to the fuel cells, when the controller confirms that the fuel cell system satisfies the flooding risk condition.

The controller may be configured to receives information regarding a standard deviation of the cell voltages of the fuel cells, and the controller may be configured to determine that the fuel cell system satisfies the flooding risk condition and performs air supercharging control, when the standard deviation of the cell voltages of the fuel cells is equal to or greater than a first reference value.

The controller may be configured to determine whether or the fuel cell system satisfies the flooding risk condition when the fuel cell system continues to be operated at a constant current for a predetermined time period or more than the predetermined time period.

The controller may terminate the air supercharging control when the standard deviation of the cell voltages is reduced to a second reference value or less than the second reference value or when the cell voltages are reduced to a predetermined lower limit voltage or less than the predetermined lower limit voltage, and may restore the flow rate of air to an original flow rate after terminating the air supercharging control.

The controller may be configured to control the flow rate of air supplied to reach a flow rate increased by a predetermined rate compared to a current air supply demand, when the controller confirms that the fuel cell system satisfies the flooding risk condition.

The controller may be configured to receive ambient air temperature information, and the controller may be configured to control the flow rate of air supplied to vary the flow rate of air supplied depending on a current ambient air temperature.

The controller, (i) when the ambient air temperature exceeds a first reference temperature and is lower than a second reference temperature, may control the flow rate of air supplied to reach a first flow rate increased by a predetermined first rate compared to the current air supply demand, (ii) when the ambient air temperature is equal to or lower than the first reference temperature, may control the flow rate of air supplied to reach a second flow rate increased by a predetermined second rate compared to the current air supply demand, and (iii) when the ambient air temperature is equal to or greater than the second reference temperature, may control the flow rate of air supplied to reach a third flow rate increased by a predetermined third rate compared to the current air supply demand, and the first rate may be greater than the third rate but may be less than the second rate.

The controller may linearly increase the flow rate of air supplied for a predetermined control time to reach the flow rate increased by the predetermined rate compared to the current air supply demand.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

FIG. 5A is a graph illustrating voltage behavior depending on the flow rates of air supplied in a low current region, in the method according to the implementation example of the present disclosure;

FIG. 5B is a graph illustrating voltage behavior depending on the flow rates of air supplied in a high current region, in the method according to the implementation example of the present disclosure.

Figure 1:
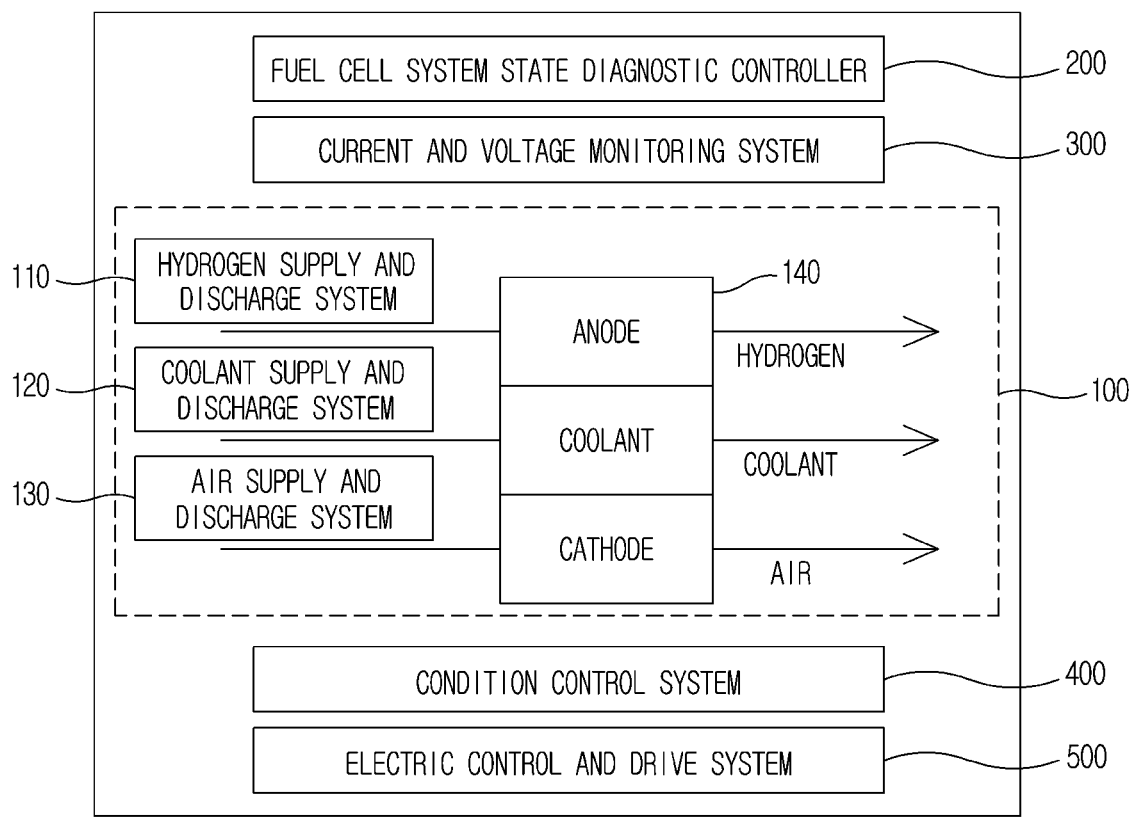
FIG. 1 is a block diagram schematically illustrating the configuration of a fuel cell system.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, a system and method for controlling a fuel cell system according to various embodiments of the present disclosure will be described with reference to the accompanying drawings.

FIG. 1 is a block diagram schematically illustrating the configuration of a fuel cell system.

The fuel cell system includes fuel cells which are operated by receiving hydrogen and air. The fuel cell includes an anode and a cathode, and a coolant channel configured to cool the fuel cell is formed. A hydrogen supply and discharge system 110 is connected to the anode to supply and discharge hydrogen to or from the anode, and an air supply and discharge system 130 is connected to the cathode to supply and discharge air to or from the cathode. Furthermore, a coolant supply and discharge system 120 is connected to the coolant channel to supply and discharge a coolant to or from the coolant channel.

Furthermore, the fuel cell system may include a current and voltage monitoring system 300 configured to monitor stack current and stack voltage, a condition control system 400 configured to control the temperature, pressure, humidity etc. of the inside of the fuel cells, and an electric control and drive system 500 configured to control and drive electric components in the fuel cell system.

Furthermore, the fuel cell system may include a fuel cell system state diagnostic controller 200 configured to diagnose the state of the fuel cell system and to control the fuel cells based on a result of diagnosis.

Figure 2:
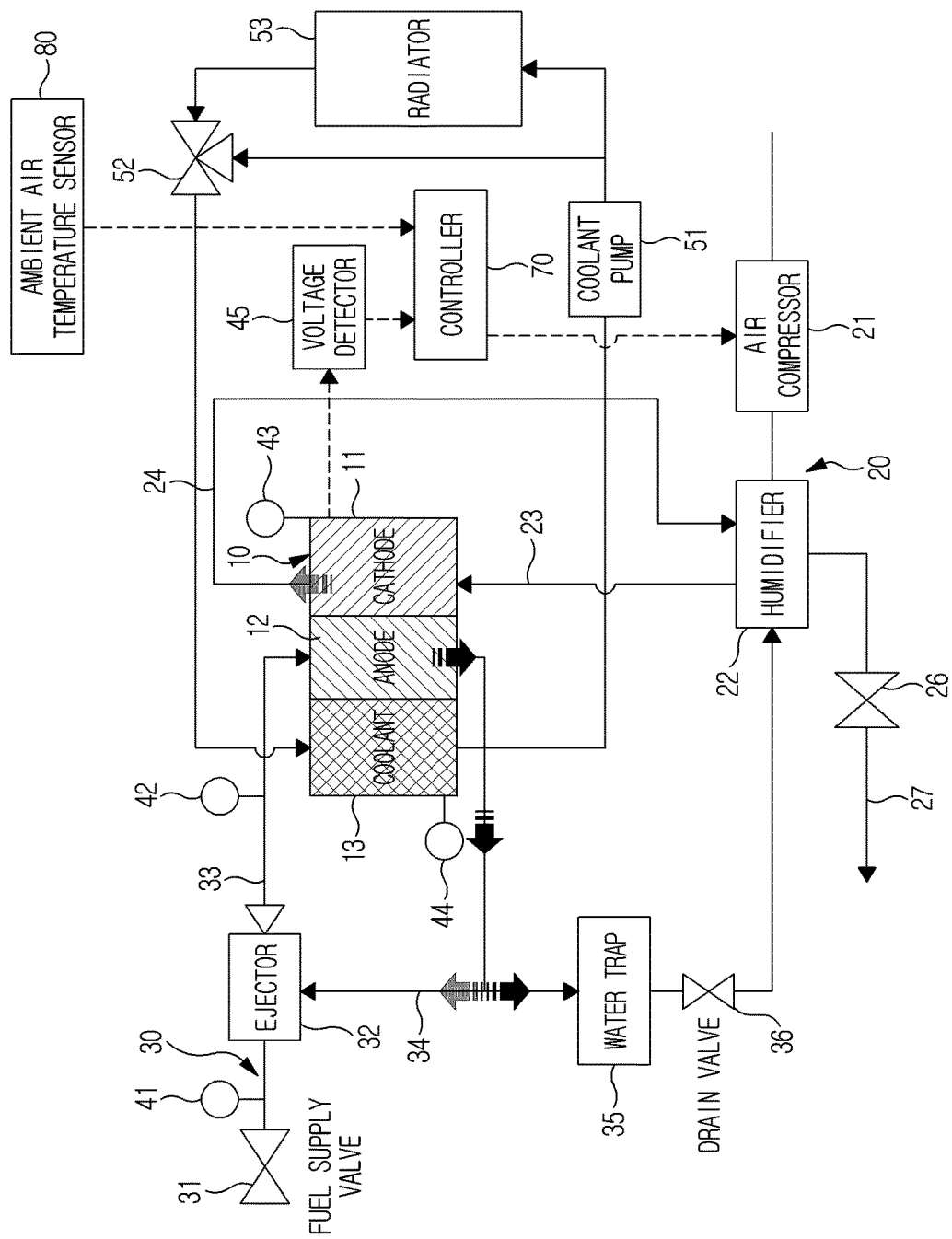
FIG. 2 is a circuit diagram illustrating a reaction and drive unit of the fuel cell system.

FIG. 2 schematically illustrates a reaction and drive unit configured to supply hydrogen and air to generate power of the fuel cell system. The reaction and drive unit of FIG. 2 is just one example provided to describe the present disclosure.

Referring to FIG. 2, an air supply device 20 provided as the air supply and discharge system 130 configured to supply air is connected to cathodes 11 of respective fuel cells of a fuel cell stack 10, and a hydrogen supply device 30 provided as the hydrogen supply and discharge system 110 configured to supply hydrogen is connected to anodes 12 of the respective fuel cells of the fuel cell stack 10.

The air supply device 20 may include an air compressor 21 configured to draw in external air, to compress the air and then to supply the compressed air to a humidifier 22, and the humidifier 22 configured to humidify the compressed air to have an appropriate humidity. The air having passed through the humidifier 22 passes through the cathodes 11 via an air supply line 23, and reacts with hydrogen at the anodes 12. A membrane humidifier which exchanges moisture between moist gas discharged after the reaction of the fuel cells and air supplied from the outside thereof may be mainly used as the humidifier 12. For the present purpose, the air discharged from the outlets of the cathodes 11 may be resupplied to the humidifier 22 along an air recovery line 24. Furthermore, an air pressure control valve 26 is provided at one side of the humidifier 22, and moist air which does not participate in humidification is discharged to the outside along an air exhaust line 27 by way of the air pressure control valve 26. The air pressure control valve 26 may adjust the open degree of the air pressure control valve 26 simultaneously with or independently of control of the rotation speed of the air compressor 21, being configured for controlling pressure applied by air supplied to the cathodes 11.

The hydrogen supply device 30 supplies hydrogen supplied through a fuel supply valve 31 to the anodes 12 through an ejector 32 along a hydrogen supply line 33. Pressure detectors 41 and 42 configured to detect pressure may be provided at the front and rear end portions of the ejector 32.

Among hydrogen supplied to the anodes 12, a part of hydrogen which does not participate in the reaction of the fuel cell stack may be recirculated to the front end portions of the anodes 12 through a hydrogen recirculation line 34, and may thus be supplied again to the anodes 12. Here, condensed water is discharged together with the part of hydrogen which does not participate in the reaction, and a water trap 35 configured to collect the condensed water is provided at the outlets of the anodes 12.

A drain valve 36 may be provided at the lower end portion of the water trap 35, and the condensed water may be discharged to the outside through the drain valve 36. In the instant case, the condensed water discharged through the drain valve 36 may be discharged to the outside along the air exhaust line 27, and may be transmitted to the humidifier 22 of the air supply device 20 to be used in humidification, as shown in FIG. 2.

Hydrogen supplied to the anodes 12 and air supplied to the cathodes 11 react with each other in the fuel cell stack 10 and thus generate power, and a current detector 43 configured to measure stack current generated due to the reaction may be provided in the fuel cell stack 10. Furthermore, a voltage detector 45 configured to measure stack voltage may be provided in the fuel cell system. The voltage detector 45 may detect a standard deviation of the stack voltage, i.e., a standard deviation of cell voltages, which is to say, the voltages of the respective fuel cells of the fuel cell stack 10. For the present purpose, the voltage detector 45 may include detectors configured to detect the voltages of the respective fuel cells in the fuel cell stack 10, or may include a unit configured to determine the cell voltages and the standard deviation of the cell voltages from other stack state information. In the description of the exemplary embodiments of the present disclosure, both the standard deviation of the stack voltage and the standard deviation of the cell voltages mean the standard deviation of the voltages of the individual fuel cells included in the fuel cell system, i.e., have the same meaning.

Furthermore, coolant channels 13 configured to supply a coolant may be provided in the fuel cells, and a coolant supply device configured to control the temperature of the coolant passing through the coolant channels 13 is provided. The coolant supply device includes a coolant pump 51 configured to pump the coolant, and a radiator 53 configured to control the temperature of the coolant through heat exchange. The radiator 53 is provided to branch off from a coolant supply line, and a coolant temperature control valve 52 configured to control the flow rate of the coolant passing through the radiator 53 is provided on the coolant supply line. The coolant temperature control valve 52 may be a three-way valve, as shown in FIG. 2, and the temperature of the coolant may be adjusted depending on requirements by controlling the open degree of the coolant temperature control valve 52. Furthermore, a coolant temperature detector 44 configured to measure the temperature of the coolant may be provided in the coolant supply device, and the coolant temperature detector 44 may be provided to measure the temperature of the coolant at the outlet of the fuel cell stack 10.

Furthermore, an ambient air temperature detector 80 configured to detect an ambient air temperature may be provided, and ambient air temperature information detected by the ambient air temperature detector 80 may be transmitted to a controller 70.

The controller 70 comprehensively collects various pieces of state information of the fuel cells, and controls all components of the fuel cells based on the collected information.

The controller 70 is configured to variably control the flow rate of air supplied based on the state information of the fuel cell stack 10, cell voltage information related to a flooding occurrence condition. For the present purpose, the controller 70 is configured to receive the cell voltage information from the voltage detector 45 and to control the air compressor 21 to vary the flow rate of air supplied based on the received cell voltage information.

Furthermore, the controller 70 is configured to receive ambient air temperature information from the ambient air temperature detector 80 and to variably control the flow rate of air supplied based on the current ambient air temperature state. For the present purpose, the controller 70 may include a determiner configured to collect the stack current, voltage information, ambient air temperature information, etc and to determine whether or not air supercharging control is necessary, and an air flow rate controller configured to control the air compressor 21 depending on a result of determination by the determiner. Furthermore, the controller 70 may include a memory including air flow rate control logic which may be referred to when the flow rate of air supplied is controlled, and in addition to the air flow rate control logic, information regarding the variable control of the flow rate of air and the state information of the fuel cell system during the corresponding control may be recorded and stored in the memory.

The controller 70 may be the fuel cell system state diagnostic controller 200 shown in FIG. 1, or may be a lower-level controller thereof, i.e., a controller configured to directly control the components of the fuel cell system based on the state information of the fuel cells or surroundings thereof detected by various detectors.

A system for controlling operation of a fuel cell system according to an implementation example of the present disclosure may indicate the controller 70 itself shown in FIG. 2, or may be the entirety of the fuel cell system, in which the controller 70 is provided, or a part of the fuel cell system.

According to the implementation example of the present disclosure, the controller 70 may be configured to confirm whether or not the fuel cell system satisfies a predetermined flooding risk condition, to increase the flow rate of air supplied compared to an air supply demand (based on the stoichiometric ratio (SR) of the cathodes), and to supply the increased flow rate of air to the fuel cells. Air supercharging control depending on whether or not the fuel cell system is exposed to the flooding risk condition will be described below with reference to FIG. 3A and FIG. 3B.

Figure 3A:
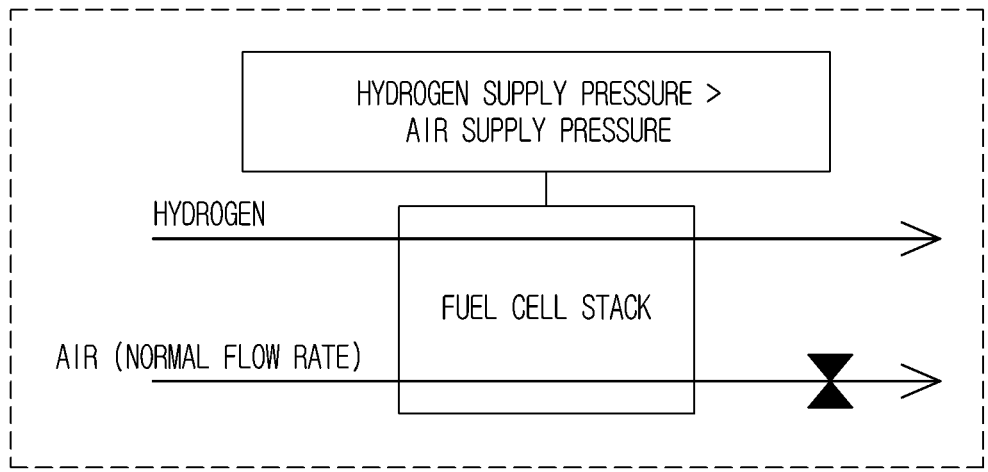
FIG. 3A is a view exemplarily illustrating the control state of a system for controlling operation of a fuel cell system according to various exemplary embodiments of the present disclosure in a normal operation condition.
Figure 3B:
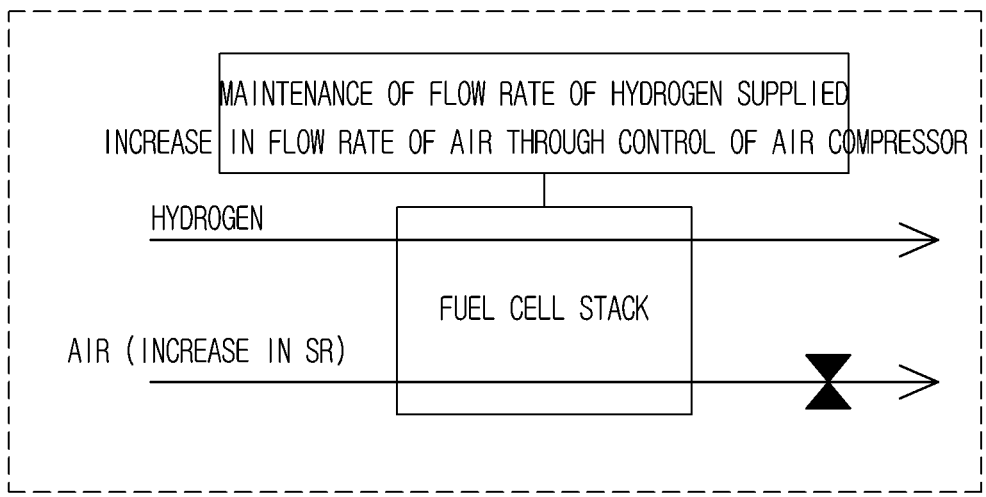
FIG. 3B is a view exemplarily illustrating the control state of the apparatus according to various exemplary embodiments of the present disclosure in a flooding condition.

FIG. 3A is a view exemplarily illustrating the control state of a system for controlling operation of a fuel cell system according to various exemplary embodiments of the present disclosure in a normal operation condition, and FIG. 3B is a view exemplarily illustrating the control state of the apparatus according to various exemplary embodiments of the present disclosure in a flooding condition.

FIG. 3A illustrates the normal operation condition before the fuel cell system enters the flooding risk condition, and under the normal operation condition, the fuel cell system may be operated in the state in which the pressure at the anode side is higher than the pressure at the cathode side. On the other hand, upon confirming that the fuel cell system satisfies the flooding risk condition, the flow rate of air supplied may be increased (for example, the SR of the cathode side may be increased by 10%). In such air supercharging control, when flooding is intensified during operating at a constant current (i.e., intensification of cell voltage fluctuation, poor voltage stability or the like) and thus the standard deviation of the stack voltage is increased to a reference value or more, the flow rate of air supplied is increased by a predetermined level (for example, the SR of the cathode side may be increased by 10%), being configured for effectively discharging water generated in the fuel cell stack 10 and thus securing voltage stability.

Furthermore, when air supercharging is continued, the fuel cell system may be exposed to a dry environment and thus the voltage of the fuel cell stack 10 may be lowered, and therefore, it is necessary to restore the flow rate of air supplied to an original value thereof when the voltage of the fuel cell stack is reduced to a reference or less.

Therefore, air supply control may be variably applied depending on the operation conditions of the fuel cell system, as shown in FIG. 3A and FIG. 3B, and for example, when air supercharging control related to the flooding risk condition, as shown in FIG. 3B, is terminated, the fuel cell system may return to the normal operation condition, as shown in FIG. 3A.

The flooding risk condition is a condition predetermined to confirm whether or not the fuel cell system is in a risk situation in which flooding may occur, and the flooding risk condition may be stored in the controller 70. In general, flooding may occur when a fuel cell vehicle is driven at a constant speed for a long time or a time of exposing the fuel cell vehicle to idling is increased, and a fuel cell power generation system may have a high risk of occurrence of flooding when the fuel cell power generation system is operated at a constant current for a long time. The flooding risk condition may be set by a combination of various fuel cell state variables. However, in the implementation example of the present disclosure, a simplified flooding risk condition is proposed to determine whether or not it is necessary to actually solve flooding. The simplified flooding risk condition may be established under the precondition that the fuel cell system is operated at a constant current for a predetermined time period (for example, 1 hour) or more, and may be defined as the case in which the standard variation of the stack voltage is increased to a predetermined value or more in the constant-current operating state of the fuel cell system for the predetermined time period or more. The case in which the standard variation of the stack voltage is increased to the predetermined value or more indicates the situation in which voltage fluctuation of the fuel cell stack is intensified, i.e., refers to the case in which changes in the respective cell voltage values are increased and thus the standard deviation of the stack voltage is excessively increased. Therefore, such a case in which the standard deviation of the stack voltage is increased to the reference value or more may be determined as a flooding occurrence risk state.

Therefore, in relation to the simplified flooding risk condition, the controller 70 may receive information regarding the standard deviation of the cell voltages of the fuel cells, may determine that the fuel cell system satisfies the flooding risk condition when the standard deviation of the cell voltages of the fuel cells is a first reference value or more, and may perform air supercharging control, i.e., may supply an increased amount of air compared to the current SR value of the cathodes.

As described above, the precondition for air supercharging control is configured so that whether or not the fuel cell system satisfies the flooding risk condition is determined only when operation of the fuel cell system at a constant current continues at a predetermined time period or more than the predetermined time period.

Air supercharging control may indicate control of air to reach a flow rate increased by a predetermined rate compared to the current air supply demand. Furthermore, in execution of air supercharging control, the flow rate of air supplied may be linearly increased for a predetermined control time to reach a target flow rate of supercharging air, i.e., the flow rate increased by the predetermined rate.

Furthermore, the controller 70 may be configured to receive ambient air temperature information, and the controller 70 may vary the flow rate of supercharging air depending on the current ambient air temperature.

Air supercharging control in which the flow rate of supercharging air is varied depending on the current ambient air temperature may be executed to exhibit different flow rates of supercharging air in three sections, as follows.

Concretely, (i) air supply may be controlled to reach a first flow rate increased by a predetermined first rate compared to the current air supply demand when the ambient air temperature exceeds a first reference temperature and is lower than a second reference temperature, (ii) air supply may be controlled to reach a second flow rate increased by a predetermined second rate compared to the current air supply demand when the ambient air temperature is equal to or lower than the first reference temperature, (iii) air supply may be controlled to reach a third flow rate increased by a predetermined third rate compared to the current air supply demand when the ambient air temperature is equal to or greater than the second reference temperature, and the first rate may be greater than the third rate but may be less than the second rate.

The controller 70 may be configured to terminate air supercharging control when flooding is solved or performance degradation, such as drop of the stack voltage to a reference or less, occurs as a result of air supercharging control. When increase in the flow rate of air supplied, i.e., air supercharging control, is performed to solve flooding, excessive supply of air may cause the fuel cells to be easily exposed to a dry condition, and may thus have a negative influence on durability of the fuel cells.

Therefore, to solve the above problem, in the implementation example of the present disclosure, air supercharging control may be terminated and the flow rate of air supplied may be returned to its original flow rate, when the standard deviation of the cell voltages is reduced to a second reference value or less than the second reference value or the cell voltages are reduced to a lower limit voltage or less.

Here, the first reference temperature may be set to 15° C., the second reference temperature may be set to 40° C., the first rate may be set to 10%, the second rate may be set to 20%, and the third rate may be set to 5%.

Figure 4:
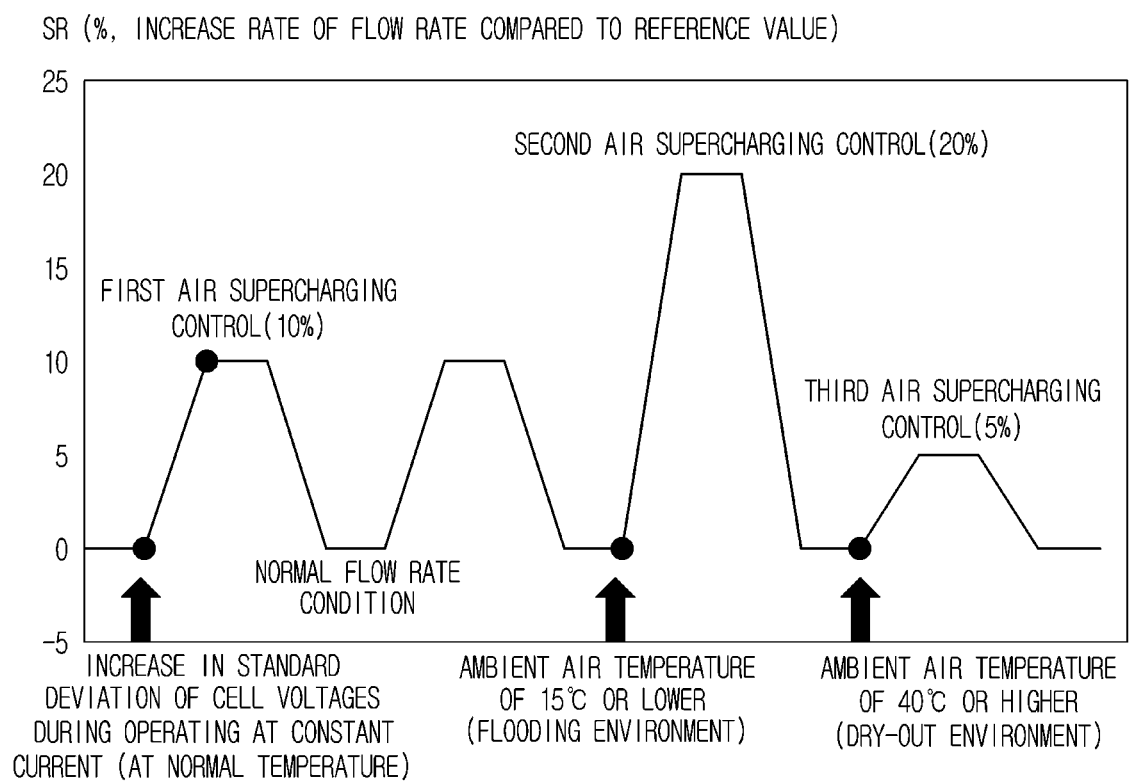
FIG. 4 is a graph conceptually illustrating control of the flow rate of air supplied in a method for controlling operation of a fuel cell system according to an implementation example of the present disclosure.

FIG. 4 is a graph illustrating control of the flow rate of air supplied, which is varied depending on an ambient air temperature, in the method for controlling operation of the fuel cell system according to the implementation example of the present disclosure. Air supercharging control executed depending on each external air temperature range and termination thereof will be described below with reference to FIG. 4.

15° C. <Ambient Air Temperature <40° C.

When the fuel cell system is operated at a constant current for a predetermined time period (for example, 1 hour or more) and the standard deviation of the stack voltage is increased (intensification of stack voltage fluctuation) and reaches a reference value or more (i.e., in a state in which the fuel cell system satisfies the flooding risk condition), control logic configured to gradually increase the flow rate of air supplied by up to 10% or more compared to the reference value (the current SR of the cathodes) through control of the air compressor is adopted to secure stability of the cell voltages, as shown in FIG. 4. In such air supercharging control, the flow rate of air supplied may be linearly increased to reach a target flow rate within a predetermined time period.

Accordingly, when the stack voltage is reduced to a reference value or less as the fuel cells are dried, the flow rate of air supplied may be gradually reduced by gradually decreasing the rate of rotation of the air compressor, and accordingly, the flow rate of air supplied may be returned to the original flow rate thereof in the normal state. Therefore, the flow rate of air supplied to the fuel cells follows the set SR of the cathodes.

Ambient Air Temperature ≤15° C.

When the fuel cell system is operated at a predetermined ambient air temperature (15° C.) or lower, the fuel cell system may be more easily exposed to the flooding condition. Therefore, when the fuel cell system is operated at a constant current for the predetermined time period and the standard deviation of the stack voltage is increased to the reference value or more, control logic configured to gradually increase the flow rate of air supplied by up to 20% compared to the reference value may be applied. In the same manner, air supercharging control may be performed so that the flow rate of air supplied is linearly increased, and when the stack voltage is reduced to the reference value or less, the flow rate of air supplied may be returned to the original flow rate thereof in the normal state.

Ambient Air Temperature ≥40° C.

When the fuel cell system is operated at a predetermined ambient air temperature (40° C.) or higher, the fuel cell system may be easily exposed to the dry-out condition. Therefore, when the fuel cell system is operated at a constant current for the predetermined time period and the standard deviation of the stack voltage is increased to the reference value or more, control logic configured to gradually increase the flow rate of air supplied by only up to 5% compared to the reference value may be applied. In the same manner, air supercharging control may be performed so that the flow rate of air supplied is linearly increased, and when the stack voltage is reduced to the reference value or less, the flow rate of air supplied may be returned to the original flow rate thereof in the normal state.

FIG. 5A and FIG. 5B show test data indicating improvement in voltage stability through variable control of the flow rate of air supplied.

Concretely, FIG. 5A is a graph illustrating voltage behavior depending on the flow rates of air supplied in a low current region (at a current density of X), in the method according to the implementation example of the present disclosure, and FIG. 5B is a graph illustrating voltage behavior depending on the flow rates of air supplied in a high current region (at a current density of Y, Y>X), in the method according to the implementation example of the present disclosure.

As shown in FIG. 5A and FIG. 5B, it may be confirmed that, in the flooding risk condition, i.e., when cell voltage fluctuation occurs during constant-speed operation of the fuel cell, the stack voltage performance of the fuel cell system may be improved and cell voltage fluctuation of the fuel cell system may be alleviated by increasing the flow rate of air supplied to a predetermined level.

Figure 6:
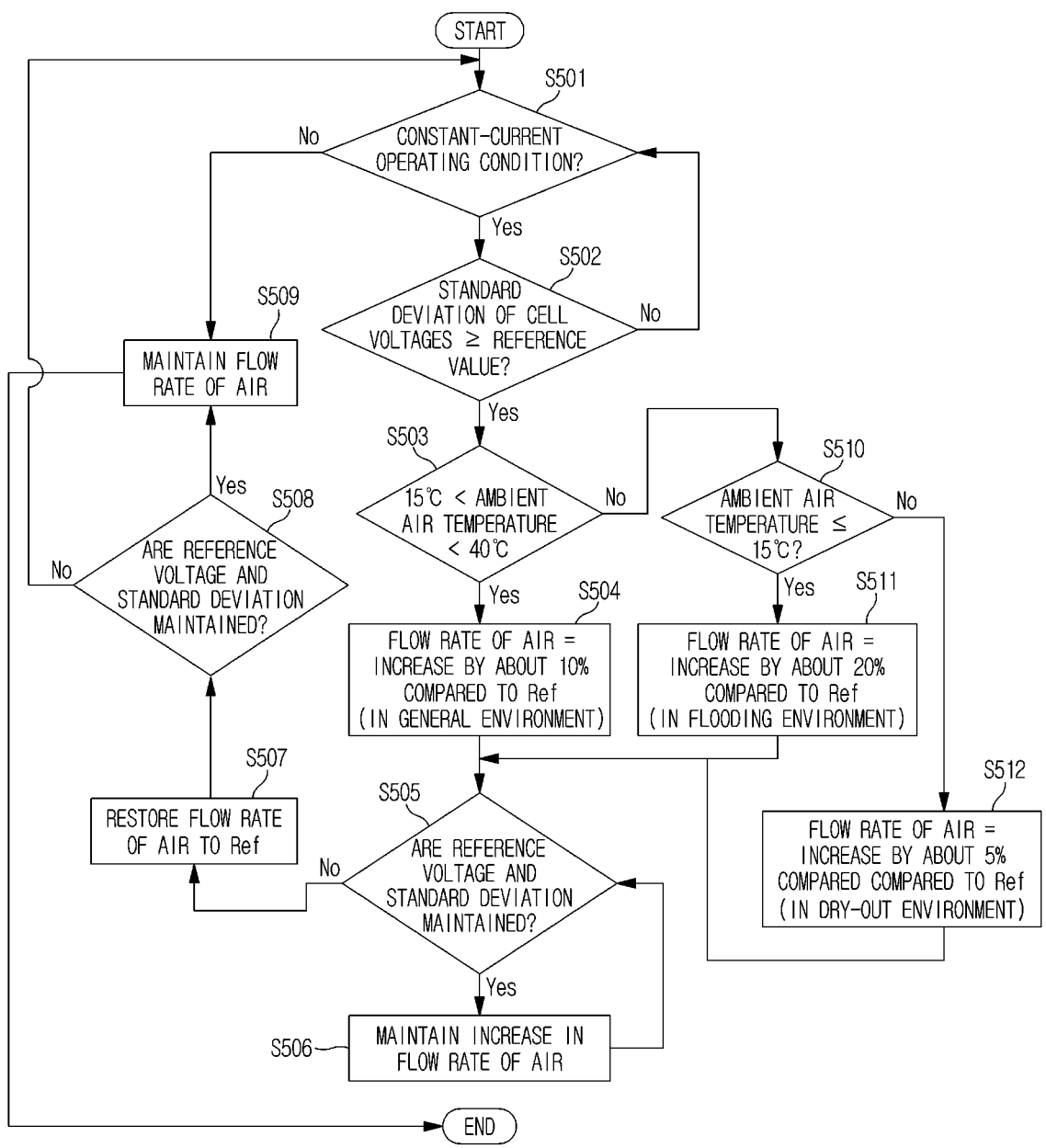
FIG. 6 is a flowchart representing a method for controlling operation of a fuel cell system according to various exemplary embodiments of the present disclosure.

Thereafter, FIG. 6 is a flowchart representing a method for controlling operation of a fuel cell system according to various exemplary embodiments of the present disclosure.

In the general operation condition of the fuel cell system, i.e., when the fuel cell system does not satisfy the flooding risk condition, the air supply device of the fuel cell system supplies the flow rate of air, determined depending on the predetermined SR of the cathodes, to the fuel cells.

In the implementation example of the present disclosure, the fuel cell system may be configured to perform air supercharging control when the fuel cell system satisfies the flooding risk condition.

Concretely, whether or not the fuel cell system corresponds to the constant-current operation condition for a predetermined time period (for example, 1 hour) or more is determined by confirming stack current (S501). The existing flow rate of air supplied is maintained upon determining that the fuel cell system does not correspond to the constant-current operation condition (S509), and it is confirmed whether or not the standard deviation of cell voltages is equal to or greater than a reference value upon determining that the fuel cell system corresponds to the constant-current operation condition (S502). Such Operations S501 and S502 may be regarded as Operation of confirming whether or not the fuel cell system satisfies the flooding risk condition, or in a limited sense, only Operation S502 may be defined as Operation confirming whether or not the fuel cell system satisfies the flooding risk condition.

Therefore, the controller may confirm whether or not the fuel cell system satisfies the flooding risk condition based on the standard deviation of the cell voltages, and may execute air supercharging control upon confirming that the fuel cell system satisfies the flooding risk condition (Operation S504, S511 or S512).

FIG. 6 describes an example in which the amount of supercharging air is variably controlled based on current ambient air temperature information.

When the ambient air temperature exceeds 15° C. and is lower than 40° C. (S503), the fuel cell system may be controlled so that air is supplied at a first flow rate increased by 10% compared to the current air supply demand (control in the general environment) (S504). During such air supercharging control, it is confirmed whether or not the reference voltage and the standard deviation of the fuel cell stack are maintained (S505), and control for increasing the flow rate of air supplied, i.e., air supercharging control, is maintained upon confirming that the reference voltage and the standard deviation of the fuel cell stack are maintained, i.e., when the fuel cell system still satisfies the flooding risk condition and stack voltage drop does not occur (S506).

On the other hand, as a result of confirmation in Operation S505, upon confirming that the reference voltage and the standard deviation of the fuel cell stack are not maintained, i.e., when the fuel cell system deviates from the flooding risk condition or stack voltage drop occurs, air supercharging control is terminated and the existing flow rate of air supplied is gradually returned to the flow rate of air supplied in accordance with the predetermined SR of the cathodes (S507). Thereafter, it may be conformed again whether or not the reference voltage and the standard deviation of the fuel cell stack are maintained (S508), and the fuel cell system may be regarded as being in the normal state and thus the current flow rate of air supplied may be maintained, upon confirming that the reference voltage and the standard deviation of the fuel cell stack are maintained in normal ranges (S509). On the other hand, upon confirming that the reference voltage and the standard deviation of the fuel cell stack are not maintained in the normal ranges, the method may be returned to Operation S501 to determine again whether or not the fuel cell system satisfies the flooding risk condition.

When the ambient air temperature deviates from the general environment, i.e., deviates from the range of 15° C. to 40° C. in Operation S503, it may be confirmed whether or not the ambient air temperature is equal to or lower than 15° C. (S510).

As a result of confirmation, upon confirming that the ambient air temperature is equal to or lower than 15° C., the fuel cell system may be controlled so that air is supplied at a second flow rate increased by 20% compared to the current air supply demand (S511).

After air supercharging control of Operation S511, control of the flow rate of air supplied may be executed in the same manner as the case in which the ambient air temperature is within the range of 15° C. to 40° C. Therefore, after Operation S511, Operations S505 to S509 may be performed.

Furthermore, upon confirming that the ambient air temperature is higher than 15° C. in Operation S510, the ambient air temperature becomes equal to or greater than 40° C. When the ambient air temperature is equal to or greater than 40° C., the fuel cell system may be controlled so that air is supplied at a third flow rate increased by 5% compared to the current air supply demand (S512). In the same manner, after Operation S512, Operations S505 to S509 may be performed.

As is apparent from the above description, a system and method for controlling operation of a fuel cell system according to various exemplary embodiments of the present disclosure may effectively preventing flooding occurring when the fuel cell system is operated at a constant current for a long time, such as constant-speed driving of a fuel cell vehicle for a long time, increase in idle time, or operation of a fuel cell power generation system.

According to an implementation example of the present disclosure, variable control of the flow rate of air supplied may prevent flooding occurring during constant-current operation of the fuel cell system, and thus, the fuel cell system may be simply controlled to prevent flooding and may effectively discharge water, being configured for securing high voltage stability, maintaining performance of a fuel cell stack, and securing durability of the fuel cell stack through simple control.

Furthermore, in an exemplary embodiment of the present disclosure, a risk of exposure of the fuel cell system to a dry environment may be detected in advance through air supercharging control and excessive stack voltage drop may be prevented thereby, thus being configured for reducing the risk of exposure of the fuel cell system to the dry environment.

Furthermore, in an exemplary embodiment of the present disclosure, control logic configured to variably control the flow rate of air supplied depending on an ambient air temperature is applied by reflecting the state change in the fuel cell stack depending on the ambient air temperature, being configured for continuously maintaining the optimization state of the fuel cell stack without a flooding condition and a dry-out condition based on the ambient air temperature and cell voltage states.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method disclosed in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the control device may be implemented in a form of hardware or software, or may be implemented in a combination of hardware and software.

Furthermore, the terms such as "unit", "module", etc. Included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A method for controlling operation of a fuel cell system, the method comprising:
   determining, by a controller, whether there is a risk of flooding by confirming whether the fuel cell system satisfies a predetermined flooding risk condition; and
   performing, by the controller, air supercharging by supplying air at a flow rate increased compared to an air supply demand to fuel cells of the fuel cell system, when the controller confirms that the fuel cell system satisfies the flooding risk condition,
   wherein the controller concludes that there is the risk of flooding when a standard deviation of cell voltages of the fuel cells is equal to or greater than a first reference value, and
   wherein, in the determining whether there is the risk of flooding, whether there is the risk of flooding is determined when the fuel cell system is operated at a constant current for a predetermined time period or more than the predetermined time period.

2. The method of claim 1,
   wherein, in the performing the air supercharging, the air supercharging is terminated by the controller, when the standard deviation of the cell voltages is reduced to a second reference value or less than the second reference value or when the cell voltages are reduced to a predetermined lower limit voltage or less than the predetermined lower limit voltage.

3. The method of claim 2, further including restoring the flow rate of air supplied to an original flow rate after the air supercharging is terminated.

4. The method of claim 1, wherein, in the performing the air supercharging, the flow rate of air supplied is controlled to reach a flow rate increased by a predetermined rate compared to a current air supply demand.

5. The method of claim 4, wherein, in the performing the air supercharging, the flow rate of air supplied is controlled to be varied depending on an ambient air temperature.

6. The method of claim 5, wherein, in the performing the air supercharging:
   when the ambient air temperature exceeds a first reference temperature and is lower than a second reference temperature, the flow rate of air supplied is controlled by the controller to reach a first flow rate increased by a predetermined first rate compared to the current air supply demand;

when the ambient air temperature is equal to or lower than the first reference temperature, the flow rate of air supplied is controlled by the controller to reach a second flow rate increased by a predetermined second rate compared to the current air supply demand; and when the ambient air temperature is equal to or greater than the second reference temperature, the flow rate of air supplied is controlled by the controller to reach a third flow rate increased by a predetermined third rate compared to the current air supply demand, wherein the predetermined first rate is greater than the predetermined third rate but is less than the predetermined second rate.

7. The method of claim 4, wherein, in the performing the air supercharging, the flow rate of air supplied is linearly increased for a predetermined control time to reach the flow rate increased by the predetermined rate compared to the current air supply demand.

8. A non-transitory computer readable storage medium on which a program for performing the method of claim 1 is recorded.

9. A system for controlling operation of a fuel cell system configured to supply air to fuel cells and including an air supply device configured to control a flow rate of air supplied, the system comprising:
a controller configured to monitor cell voltages of the fuel cells and to control the flow rate of air supplied according to a result of monitoring of the cell voltages,
wherein the controller is configured to confirm whether the fuel cell system satisfies a predetermined flooding risk condition based on the cell voltages, to increase the flow rate of air supplied compared to an air supply demand by control of the air supply device, and to supply the increased flow rate of air supplied to the fuel cells by control of the air supply device when the controller confirms that the fuel cell system satisfies the flooding risk condition,
wherein the controller is configured to receives information regarding a standard deviation of the cell voltages of the fuel cells,
wherein the controller is configured to determine that the fuel cell system satisfies the flooding risk condition and to perform air supercharging control by control of the air supply device when the standard deviation of the cell voltages of the fuel cells is equal to or greater than a first reference value, and
wherein the controller is configured to determine whether the fuel cell system satisfies the flooding risk condition when the fuel cell system continues to be operated at a constant current for a predetermined time period or more than the predetermined time period.

10. The system of claim 9, wherein the controller is configured to terminate the air supercharging control when the standard deviation of the cell voltages is reduced to a second reference value or less than the second reference value or when the cell voltages are reduced to a predetermined lower limit voltage or less than the predetermined lower limit voltage.

11. The system of claim 10, wherein the controller is configured to restore the flow rate of air to an original flow rate after terminating the air supercharging control.

12. The system of claim 9, wherein the controller is configured to control the flow rate of air supplied to reach a flow rate increased by a predetermined rate compared to a current air supply demand, when the controller confirms that the fuel cell system satisfies the flooding risk condition.

13. The system of claim 12,
wherein the controller is configured to receive ambient air temperature information, and
wherein the controller is configured to control the flow rate of air supplied to vary the flow rate of air supplied depending on a current ambient air temperature.

14. The system of claim 13, wherein
when the ambient air temperature exceeds a first reference temperature and is lower than a second reference temperature, the controller is configured to control the flow rate of air supplied to reach a first flow rate increased by a predetermined first rate compared to the current air supply demand;
when the ambient air temperature is equal to or lower than the first reference temperature, the controller is configured to control the flow rate of air supplied to reach a second flow rate increased by a predetermined second rate compared to the current air supply demand; and
when the ambient air temperature is equal to or greater than the second reference temperature, the controller is configured to control the flow rate of air supplied to reach a third flow rate increased by a predetermined third rate compared to the current air supply demand,
wherein the predetermined first rate is greater than the predetermined third rate but is less than the predetermined second rate.

15. The system of claim 12, wherein, in the performing air supercharging control, the controller is configured to increase the flow rate of air supplied linearly for a predetermined control time to reach the flow rate increased by the predetermined rate compared to the current air supply demand.

* * * * *